US012676690B2

(12) United States Patent
Liu et al.

(10) Patent No.: US 12,676,690 B2
(45) Date of Patent: Jul. 7, 2026

(54) COMMUNICATION DEVICE AND METHOD THEREIN FOR GENERATING RANDOM ACCESS PREAMBLES

(71) Applicant: Telefonaktiebolaget LM Ericsson (publ), Stockholm (SE)

(72) Inventors: Guang Liu, Beijing (CN); Yang Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 283 days.

(21) Appl. No.: 18/690,890

(22) PCT Filed: Aug. 1, 2022

(86) PCT No.: PCT/CN2022/109395
§ 371 (c)(1),
(2) Date: Mar. 11, 2024

(87) PCT Pub. No.: WO2023/051014
PCT Pub. Date: Apr. 6, 2023

(65) Prior Publication Data
US 2024/0340101 A1     Oct. 10, 2024

(30) Foreign Application Priority Data

Sep. 30, 2021   (WO) ................ PCT/CN2021/122061

(51) Int. Cl.
*H04J 13/00*          (2011.01)
*H04W 74/0833*    (2024.01)

(52) U.S. Cl.
CPC ..... *H04J 13/0055* (2013.01); *H04W 74/0833* (2013.01)

(58) Field of Classification Search
None
See application file for complete search history.

(56) References Cited

U.S. PATENT DOCUMENTS 11,234,136 B2 *   1/2022  Li ..................... H04L 27/26025
11,431,464 B2 *   8/2022  Zhang .................. H04L 1/0072
(Continued)

FOREIGN PATENT DOCUMENTS

CN          105208669 B        1/2019

OTHER PUBLICATIONS

Author Unknown, "Technical Specification Group Radio Access Network; NR; Physical channels and modulation (Release 15)," Technical Specification 38.211, Version 15.9.0, Jun. 2021, 3GPP Organizational Partners, 97 pages.
(Continued)

*Primary Examiner* — Brian S Roberts
(74) *Attorney, Agent, or Firm* — Withrow & Terranova, PLLC

(57)          ABSTRACT
The present disclosure provides a method in a communication device. The method includes: determining whether a configured root sequence index falls within a predetermined range of root sequence indices, wherein the predetermined range is for a restricted set configuration and a zero correlation zone configuration; setting a current root sequence index to the configured root sequence index when the configured root sequence index falls within the predetermined range, or to a smallest root sequence index in the predetermined range when the configured root sequence index does not fall within the predetermined range; and generating, or attempting to generate, at least one random access preamble based on the current root sequence index.

12 Claims, 6 Drawing Sheets

US 12,676,690 B2

Page 2

(56)        References Cited

U.S. PATENT DOCUMENTS

2016/0119887 A1*   4/2016  Charipadi ........... H04J 13/0062
                                            370/335
2018/0317261 A1   11/2018  Sung et al.
2020/0059390 A1    2/2020  Zhang et al.
2020/0351853 A1   11/2020  Xiong et al.
2020/0383147 A1*  12/2020  Yoon ................... H04L 27/2605

OTHER PUBLICATIONS

LG Electronics, "R1-073498: Cyclic Shift Configuration Set for Non-Synchronized RACH," 3GPP TSG RAN WG1 Meeting #50, Aug. 20-24, 2007, Athens, Greece, 2 pages.
NTT DOCOMO, Inc., "R2-1712305: RAN WG's progress on NR WI in the October meeting 2017," 3GPP TSG-RAN WG2 #100, Nov. 27-Dec. 1, 2017, Reno, Nevada, 101 pages.
International Search Report and Written Opinion for International Patent Application No. PCT/CN2022/109395, mailed Oct. 25, 2022, 9 pages.
Extended European Search Report for European Patent Application No. 22874410.8, mailed Jun. 10, 2025, 8 pages.

* cited by examiner

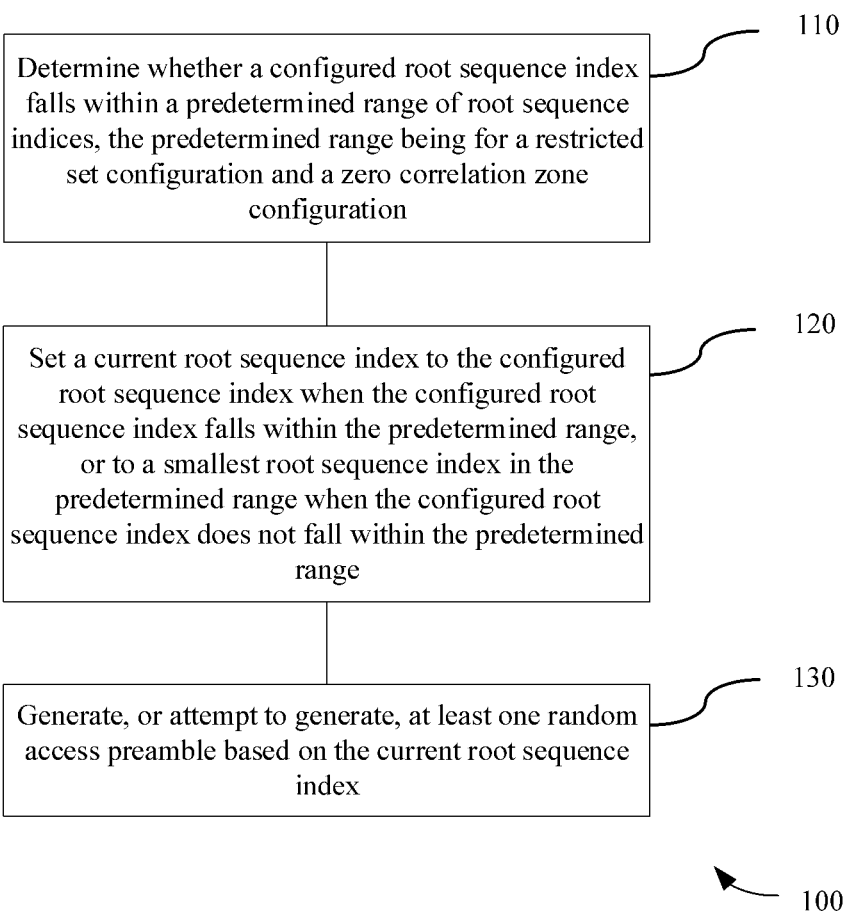

110

Determine whether a configured root sequence index falls within a predetermined range of root sequence indices, the predetermined range being for a restricted set configuration and a zero correlation zone configuration

120

Set a current root sequence index to the configured root sequence index when the configured root sequence index falls within the predetermined range, or to a smallest root sequence index in the predetermined range when the configured root sequence index does not fall within the predetermined range

130

Generate, or attempt to generate, at least one random access preamble based on the current root sequence index

COMMUNICATION DEVICE
200

COMMUNICATION DEVICE
300

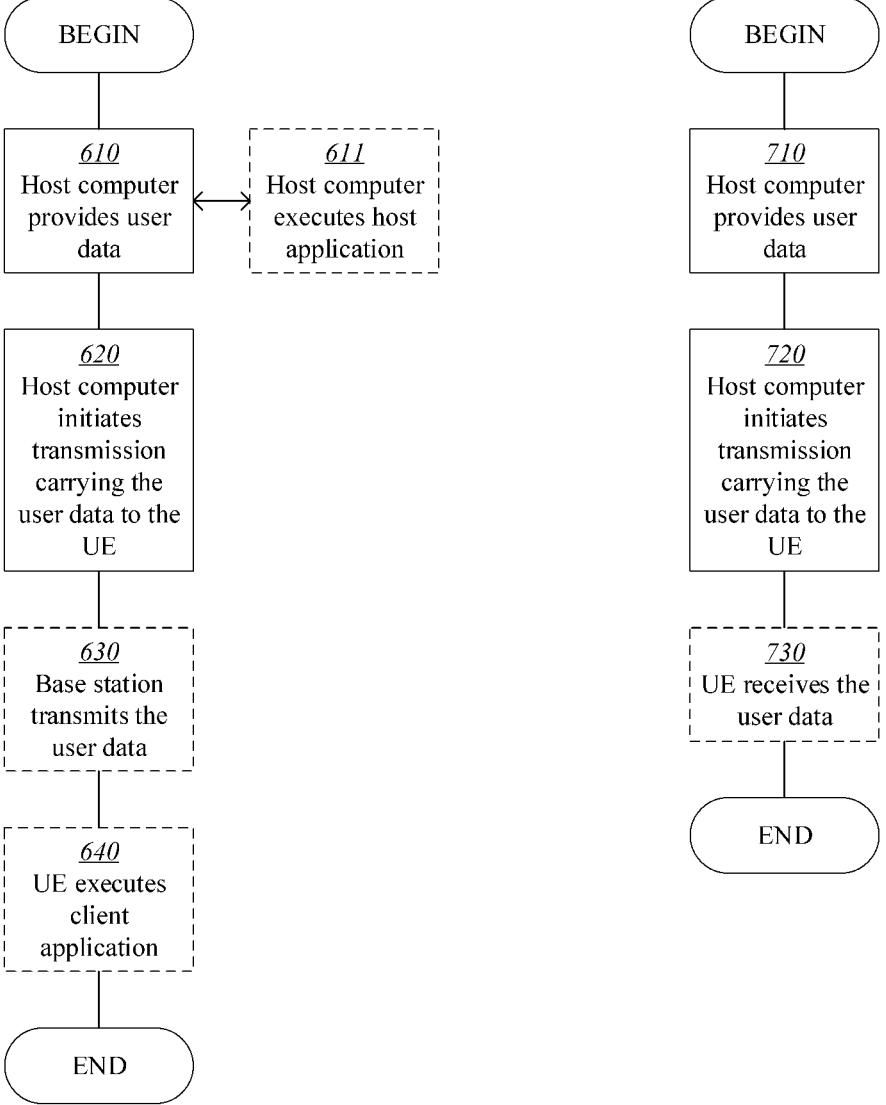
FIG. 6          FIG. 7

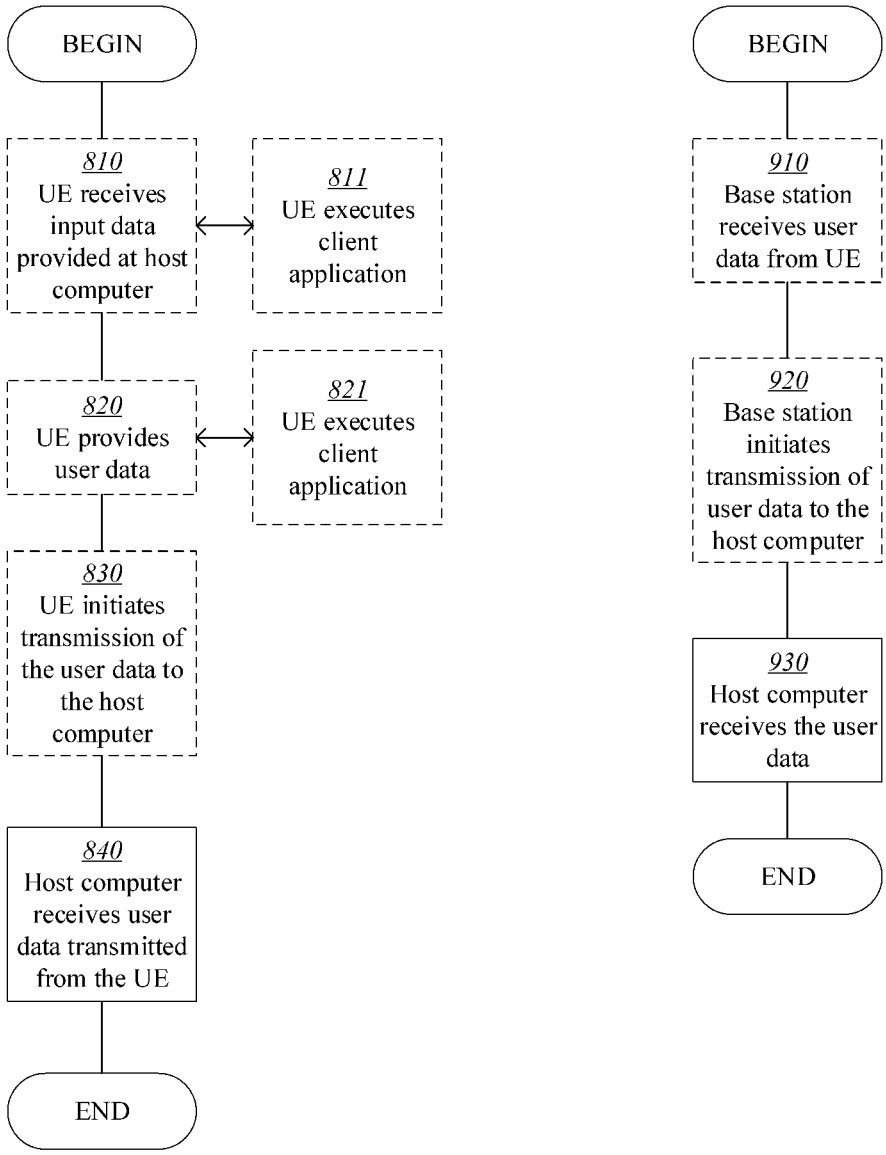
FIG. 8       FIG. 9

COMMUNICATION DEVICE AND METHOD THEREIN FOR GENERATING RANDOM ACCESS PREAMBLES

This application is a 35 U.S.C. § 371 national phase filing of International Application No. PCT/CN2022/109395, filed Aug. 1, 2022, which claims the benefit of International Application No. PCT/CN2021/122061, filed Sep. 30, 2021, the disclosures of which are incorporated herein by reference in their entireties.

TECHNICAL FIELD

The present disclosure relates to communication technology, and more particularly, to a communication device and a method therein for generating Random Access (RA) preambles.

BACKGROUND

The $3^{rd}$ Generation Partnership Project (3GPP) Technical Specification (TS) 38.211, V15.9.0, which is incorporated here by reference in its entirety, specifies sequence generation for Physical Random Access Channel (PRACH) in Section 6.3.3.1. A set of RA preambles $x_{u,v}(n)$ shall be generated according to:

$$x_{u,v}(n) = x_u((n + C_v) \bmod L_{RA})$$

$$x_u(i) = e^{-j\frac{\pi u i(i+1)}{L_{RA}}}, i = 0, 1, \ldots, L_{RA} - 1$$

where u is a sequence number, n=0, 1, . . . , $L_{RA}$−1, $L_{RA}$ denotes a length of the RA preamble, and $C_v$ denotes a cyclic shift. From the above equations, the frequency-domain representation shall be generated according to:

$$y_{u,v}(n) = \sum_{m=0}^{L_{RA}-1} x_{u,v}(m) \cdot e^{-j\frac{2\pi mn}{L_{RA}}}$$

where $L_{RA}$=839 or $L_{RA}$=139 depending on the PRACH preamble format as given by Tables 6.3.3.1-1 and 6.3.3.1-2 in TS 38.211 (reproduced as Tables 1 and 2 below, respectively).

There are 64 preambles defined in each time-frequency PRACH occasion, enumerated in increasing order of first increasing cyclic shift $C_v$ of a logical root sequence (or referred to as root sequence), and then in increasing order of the logical root sequence index, starting with the index obtained the from higher-layer parameter prach-RootSequenceIndex or rootSequenceIndex-BFR. Additional preamble sequences, in case 64 preambles cannot be generated from a single root Zadoff-Chu sequence, are obtained from the root sequences with the consecutive logical indexes until all the 64 sequences are found. The logical root sequence order is cyclic; the logical index 0 is consecutive to 837 when $L_{RA}$=839 and is consecutive to 137 when $L_{RA}$=139. The sequence number u is obtained from the logical root sequence index according to Tables 6.3.3.1-3 and 6.3.3.1-4 in TS 38.211 (reproduced as Tables 3 and 4 below, respectively).

The cyclic shift $C_v$ is given by $$C_v = \begin{cases} vN_{CS} & v = 0, 1, \ldots, \lfloor L_{RA}/N_{CS} \rfloor - 1, N_{CS} \neq 0 & \text{for unrestricted sets} \\ 0 & N_{CS} = 0 & \text{for unrestricted sets} \\ \underline{d}_{start} \lfloor v/n_{shift}^{RA} \rfloor + (v \bmod n_{shift}^{RA})N_{CS} & v = 0, 1, \ldots, w-1 & \text{for restricted sets type } A \text{ and } B \\ \underline{d}_{start} + (v-w)N_{CS} & v = w, \ldots, w + \overline{\overline{n}}_{shift}^{RA} - 1 & \text{for restricted sets type } B \\ d_{start} + \left(v - w - \overline{\overline{n}}_{shift}^{RA}\right)N_{CS} & v = w + \overline{\overline{n}}_{shift}^{RA}, \ldots, w + \overline{\overline{n}}_{shift}^{RA} + \overline{\overline{\overline{n}}}_{shift}^{RA} - 1 & \text{for restricted sets type } B \end{cases}$$

$$w = n_{shift}^{RA} n_{group}^{RA} + \overline{n}_{shift}^{RA}$$

where $N_{CS}$ is given by Tables 6.3.3.1-5 to 6.3.3.1-7 in TS 38.211 (reproduced as Tables 5-7 below, respectively), the higher-layer parameter restrictedSetConfig determines the type of restricted sets (unrestricted, restricted type A, restricted type B), and Tables 1 and 2 indicate the type of restricted sets supported for the different preamble formats (where $\Delta f_{RA}$ denotes a sub-carrier spacing for random-access preambles).

SUMMARY

In the New Radio (NR) system, for a PRACH unrestricted set, every available root sequence index (which is mapped to a sequence number u) can be used for generating one or more RA preambles. However, for restricted set type A or B, not all cyclic shifts derived from one root sequence can be used to generate an RA preamble due to cyclic shift restriction. In some cases, even no cyclic shifts derived from one root sequence can be used to generate an RA preamble, meaning that such root sequence, or its corresponding root sequence index, is invalid. It would be a waste of resources when trying to generate an RA preamble based on such invalid root sequence.

It is an object of the present disclosure to provide a communication device and a method therein, capable of improving efficiency in RA preamble generation.

According to a first aspect of the present disclosure, a method in a communication device is provided. The method includes: determining whether a configured root sequence index falls within a predetermined range of root sequence indices. The predetermined range is for a restricted set configuration and a zero correlation zone configuration. The method further includes: setting a current root sequence index to the configured root sequence index when the configured root sequence index falls within the predetermined range, or to a smallest root sequence index in the predetermined range when the configured root sequence index does not fall within the predetermined range. The method further includes: generating, or attempting to generate, at least one random access preamble based on the current root sequence index.

In an embodiment, the smallest root sequence index may be a minimum value, among available root sequence indices, that is valid for generating a random access preamble, depending on the restricted set configuration and the zero correlation zone configuration.

In an embodiment, a largest root sequence index in the predetermined range may be a maximum value, among available root sequence indices, that is valid for generating a random access preamble, depending on the restricted set configuration and the zero correlation zone configuration.

In an embodiment, the restricted set configuration may include restricted set type A or restricted set type B.

In an embodiment, the method may further include: storing information identifying the predetermined range for the restricted set configuration and the zero correlation zone configuration.

In an embodiment, the information may include the smallest root sequence index and the largest root sequence index of the predetermined range.

In an embodiment, the method may further include, when the attempting fails or when a total number of random access preambles to be generated has not been reached after the at least one random access preamble is generated: incrementing the current root sequence index in a cyclic manner within the predetermined range; and generating, or attempting to generate, at least one random access preamble based on the incremented current root sequence index.

In an embodiment, the method may be performed at a physical layer, and the configured root sequence index, the restricted set configuration, the zero correlation zone configuration, and/or the total number of random access preambles to be generated may be higher-layer configured parameters.

In an embodiment, the communication device may be a terminal device, and one or more of the higher-layer configured parameters may be received from a network device.

In an embodiment, the communication device may be a network device.

According to a second aspect of the present disclosure, a communication device is provided. The communication device includes a determining unit configured to determine whether a configured root sequence index falls within a predetermined range of root sequence indices. The predetermined range is for a restricted set configuration and a zero correlation zone configuration. The communication device further includes a setting unit configured to set a current root sequence index to the configured root sequence index when the configured root sequence index falls within the predetermined range, or to a smallest root sequence index in the predetermined range when the configured root sequence index does not fall within the predetermined range. The communication device further includes a generating unit configured to generate, or attempt to generate, at least one random access preamble based on the current root sequence index.

According to a third aspect of the present disclosure, a communication device is provided. The communication device includes a transceiver, a processor, and a memory. The memory contains instructions executable by the processor whereby the communication device is operative to perform the method according to the above first aspect.

According to a fourth aspect of the present disclosure, a computer readable storage medium is provided. The computer readable storage medium has computer program instructions stored thereon. The computer program instructions, when executed by a processor in a communication device, cause the communication device to perform the method according to the above first aspect.

With the embodiments of the present disclosure, a range of root sequence indices can be predetermined for a restricted set configuration and a zero correlation zone configuration. A current root sequence index can be set to a configured root sequence index when the configured root sequence index falls within the predetermined range, or to a smallest root sequence index in the predetermined range when the configured root sequence index does not fall within the predetermined range. For the restricted set configuration and the zero correlation zone configuration, only the root sequence indices in the predetermined range may be used to generate an RA preamble, so as to avoid unnecessary waste of resources in trying to generate an RA preamble based on invalid root sequences. In this way, the efficiency in RA preamble generation can be improved.

BRIEF DESCRIPTION OF THE DRAWINGS

The above and other objects, features and advantages will be more apparent from the following description of embodiments with reference to the figures, in which:

FIG. 1 is a flowchart illustrating a method in a communication device according to an embodiment of the present disclosure;

FIGS. 6 to 9 are flowcharts illustrating methods implemented in a communication system including a host computer, a base station and a user equipment.

DETAILED DESCRIPTION

Figure 2:
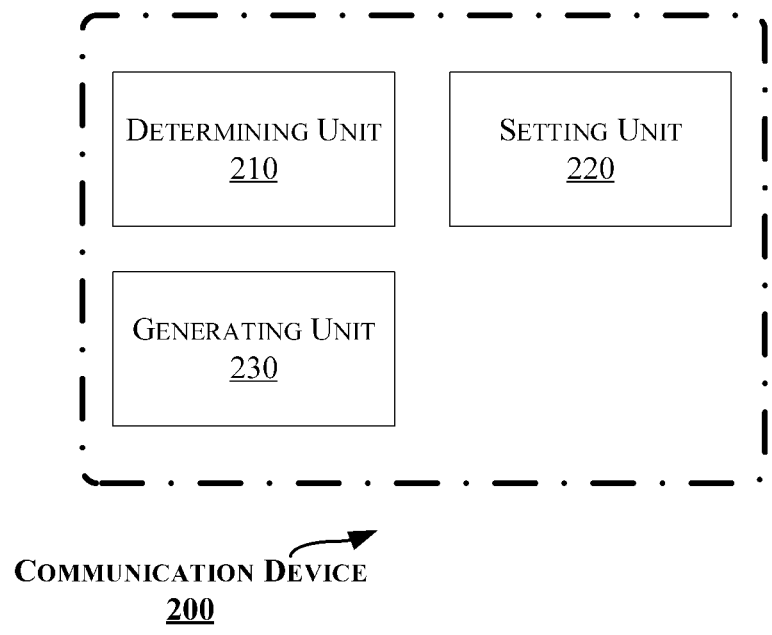
FIG. 2 is a block diagram of a communication device according to an embodiment of the present disclosure.

As used herein, the term "wireless communication network" refers to a network following any suitable communication standards, such as NR, LTE-Advanced (LTE-A), LTE, Wideband Code Division Multiple Access (WCDMA). High-Speed Packet Access (HSPA), and so on. Furthermore, the communications between a terminal device and a network node in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G. 3G (the third generation), 4G (the fourth generation), 4.5G, 5G (the fifth generation), beyond 5G (e.g., 6G (sixth generation), or future communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network node" or "network device" refers to a device in a wireless communication network via which a terminal device accesses the network and receives services therefrom. The network node or network device refers to a base station (BS), an access point (AP), or any other suitable device in the wireless communication network. The BS may be, for example, a node B (NodeB or NB), an evolved NodeB (eNodeB or eNB), or a (next) generation (gNB), a Remote Radio Unit (RRU), a radio header (RH), a remote radio head (RRH), a relay, a low power node such as a femto, a pico, and so forth. Yet further examples of the network node may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network node may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VOIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from the network node to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has". "having". "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Further details of the RA preamble generation according to TS 38.211 will be described below.

The variable $d_u$ is given by $$d_u = \begin{cases} q & 0 \le q < L_{RA}/2 \\ L_{RA}-q & \text{otherwise} \end{cases}$$

where q is the smallest non-negative integer that fulfils (qu)mod $L_{RA}$=1. The parameters for restricted sets of cyclic shifts depend on $d_u$.

For restricted set type A, the parameters are given by: for $N_{CS} \le d_u < L_{RA}/3$ $$n_{shift}^{RA} = \lfloor d_u/N_{CS} \rfloor$$

$$d_{start} = 2d_u + n_{shift}^{RA} N_{CS}$$

$$n_{group}^{RA} = \lfloor L_{RA}/d_{start} \rfloor$$

-continued $$\bar{n}_{shift}^{RA} = \max\left(\left\lfloor\left(L_{RA} - 2d_u - n_{group}^{RA}d_{start}\right)/N_{CS}\right\rfloor, 0\right)$$

for $L_{RN}/3 \le d_u \le (L_{RA} - N_{CS})/2$ $$n_{shift}^{RA} = \left\lfloor (L_{RA} - 2d_u)/N_{CS} \right\rfloor$$

$$d_{start} = L_{RA} - 2d_u + n_{shift}^{RA}N_{CS}$$

$$n_{group}^{RA} = \left\lfloor d_u/d_{start} \right\rfloor$$

$$\bar{n}_{shift}^{RA} = \min\left(\max\left(\left\lfloor\left(d_u - n_{group}^{RA}d_{start}\right)/N_{CS}\right\rfloor, 0\right), n_{shift}^{RA}\right)$$

For restricted set type B, the parameters are given by:
for $N_{CS} \le d_u < L_{RA}/5$ $$n_{shift}^{RA} = \left\lfloor d_u/N_{CS} \right\rfloor$$

$$d_{start} = 4d_u + n_{shift}^{RA}N_{CS}$$

$$n_{group}^{RA} = \left\lfloor L_{RA}/d_{start} \right\rfloor$$

$$\bar{n}_{shift}^{RA} = \max\left(\left\lfloor\left(L_{RA} - 4d_u - n_{group}^{RA}d_{start}\right)/N_{CS}\right\rfloor, 0\right)$$

for $L_{RA}/5 \le d_u \le (L_{RA} - N_{CS})/4$ $$n_{shift}^{RA} = \left\lfloor (L_{RA} - 4d_u)/N_{CS} \right\rfloor$$

$$d_{start} = L_{RA} - 4d_u + n_{shift}^{RA}N_{CS}$$

$$n_{group}^{RA} = \left\lfloor d_u/d_{start} \right\rfloor$$

$$\bar{n}_{shift}^{RA} = \min\left(\max\left(\left\lfloor\left(d_u - n_{group}^{RA}d_{start}\right)/N_{CS}\right\rfloor, 0\right), n_{shift}^{RA}\right)$$

for $(L_{RA} + N_{CS})/4 \le d_u < 2L_{RA}/7$ $$n_{shift}^{RA} = \left\lfloor (4d_u - L_{RA})/N_{CS} \right\rfloor$$

$$d_{start} = 4d_u - L_{RA} + n_{shift}^{RA}N_{CS}$$

$$\bar{d}_{start} = L_{RA} - 3d_u + n_{group}^{RA}d_{start} + \bar{n}_{shift}^{RA}N_{CS}$$

$$\bar{\bar{d}}_{start} = L_{RA} - 2d_u + n_{group}^{RA}d_{start} + \bar{\bar{n}}_{shift}^{RA}N_{CS}$$

$$n_{group}^{RA} = \left\lfloor d_u/d_{start} \right\rfloor$$

$$\bar{n}_{shift}^{RA} = \max\left(\left\lfloor\left(L_{RA} - 3d_u - n_{group}^{RA}d_{start}\right)/N_{CS}\right\rfloor, 0\right)$$

$$\bar{\bar{n}}_{shift}^{RA} = \left\lfloor\min\left(d_u - n_{group}^{RA}d_{start}, 4d_u - L_{RA} - \bar{n}_{shift}^{RA}N_{CS}\right)/N_{CS}\right\rfloor$$

$$\bar{\bar{\bar{n}}}_{shift}^{RA} = \left\lfloor\left(\left(1 - \min\left(1, \bar{\bar{n}}_{shift}^{RA}\right)\right)\left(d_u - n_{group}^{RA}d_{start}\right) + \min\right.$$
$$\left.\left(1, \bar{\bar{n}}_{shift}^{RA}\right)\left(4d_u - L_{RA} - \bar{n}_{shift}^{RA}N_{CS}\right)\right)/N_{CS}\right\rfloor - \bar{\bar{n}}_{shift}^{RA}$$

for $2L_{RA}/7 \le d_u \le (L_{RA} - N_{CS})/3$ $$n_{shift}^{RA} = \left\lfloor (L_{RA} - 3d_u)/N_{CS} \right\rfloor$$

$$d_{start} = L_{RA} - 3d_u + n_{shift}^{RA}N_{CS}$$

$$\bar{d}_{start} = d_u + n_{group}^{RA}d_{start} + \bar{n}_{shift}^{RA}N_{CS}$$

$$\bar{\bar{d}}_{start} = 0$$

-continued $$n_{group}^{RA} = \left\lfloor d_u/d_{start} \right\rfloor$$

$$\bar{n}_{shift}^{RA} = \max\left(\left\lfloor\left(4d_u - L_{RA} - n_{group}^{RA}d_{start}\right)/N_{CS}\right\rfloor, 0\right)$$

$$\bar{\bar{n}}_{shift}^{RA} = \left\lfloor\min\left(d_u - n_{group}^{RA}d_{start}, L_{RA} - 3d_u - \bar{n}_{shift}^{RA}N_{CS}\right)/N_{CS}\right\rfloor$$

$$\bar{\bar{\bar{n}}}_{shift}^{RA} = 0$$

for $(L_{RA} + N_{CS})/3 \le d_u < 2L_{RA}/5$ $$n_{shift}^{RA} = \left\lfloor (3d_u - L_{RA})/N_{CS} \right\rfloor$$

$$d_{start} = 3d_u - L_{RA} + n_{shift}^{RA}N_{CS}$$

$$\bar{\bar{d}}_{start} = 0$$

$$\bar{\bar{\bar{d}}}_{start} = 0$$

$$n_{group}^{RA} = \left\lfloor d_u/d_{start} \right\rfloor$$

$$\bar{n}_{shift}^{RA} = \max\left(\left\lfloor\left(L_{RA} - 2d_u - n_{group}^{RA}d_{start}\right)/N_{CS}\right\rfloor, 0\right)$$

$$\bar{\bar{n}}_{shift}^{RA} = 0$$

$$\bar{\bar{\bar{n}}}_{shift}^{RA} = 0$$

for $2L_{RA}/5 \le d_u \le (L_{RA} - N_{CS})/2$ $$n_{shift}^{RA} = \left\lfloor (L_{RA} - 2d_u)/N_{CS} \right\rfloor$$

$$d_{start} = 2(L_{RA} - 2d_u) + n_{shift}^{RA}N_{CS}$$

$$\bar{d}_{start} = 0$$

$$\bar{\bar{d}}_{start} = 0$$

$$n_{group}^{RA} = \left\lfloor (L_{RA} - d_u)/d_{start} \right\rfloor$$

$$\bar{n}_{shift}^{RA} = \max\left(\left\lfloor\left(3d_u - L_{RA} - n_{group}^{RA}d_{start}\right)/N_{CS}\right\rfloor, 0\right)$$

$$\bar{\bar{n}}_{shift}^{RA} = 0$$

$$\bar{\bar{\bar{n}}}_{shift}^{RA} = 0$$

For all other values of $d_u$, there are no cyclic shifts in the restricted set.

TABLE 1

PRACH preamble formats for $L_{RA} = 839$ and $\Delta f^{RA} \in \{1.25, 5\}$ kHz.

| Format | $L_{RA}$ | $\Delta f^{RA}$ | $N_u$ | $N_{CP}^{RA}$ | Support for restricted sets |
|---|---|---|---|---|---|
| 0 | 839 | 1.25 kHz | 24576κ | 3168κ | Type A, Type B |
| 1 | 839 | 1.25 kHz | 2 · 24576κ | 21024κ | Type A, Type B |
| 2 | 839 | 1.25 kHz | 4 · 24576κ | 4688κ | Type A, Type B |
| 3 | 839 | 5 kHz | 4 · 6144κ | 3168κ | Type A, Type B |

TABLE 2

| Format | $L_{RA}$ | $\Delta f^{RA}$ | $N_u$ | $N_{CP}^{RA}$ | Support for restricted sets |
|---|---|---|---|---|---|
| A1 | 139 | $15 \cdot 2^{\mu}$ kHz | $2 \cdot 2048\kappa \cdot 2^{-\mu}$ | $288\kappa \cdot 2^{-\mu}$ | — |
| A2 | 139 | $15 \cdot 2^{\mu}$ kHz | $4 \cdot 2048\kappa \cdot 2^{-\mu}$ | $576\kappa \cdot 2^{-\mu}$ | — |
| A3 | 139 | $15 \cdot 2^{\mu}$ kHz | $6 \cdot 2048\kappa \cdot 2^{-\mu}$ | $864\kappa \cdot 2^{-\mu}$ | — |
| B1 | 139 | $15 \cdot 2^{\mu}$ kHz | $2 \cdot 2048\kappa \cdot 2^{-\mu}$ | $216\kappa \cdot 2^{-\mu}$ | — |
| B2 | 139 | $15 \cdot 2^{\mu}$ kHz | $4 \cdot 2048\kappa \cdot 2^{-\mu}$ | $360\kappa \cdot 2^{-\mu}$ | — |
| B3 | 139 | $15 \cdot 2^{\mu}$ kHz | $6 \cdot 2048\kappa \cdot 2^{-\mu}$ | $504\kappa \cdot 2^{-\mu}$ | — |
| B4 | 139 | $15 \cdot 2^{\mu}$ kHz | $12 \cdot 2048\kappa \cdot 2^{-\mu}$ | $936\kappa \cdot 2^{-\mu}$ | — |
| C0 | 139 | $15 \cdot 2^{\mu}$ kHz | $2048\kappa \cdot 2^{-\mu}$ | $1240\kappa \cdot 2^{-\mu}$ | — |
| C2 | 139 | $15 \cdot 2^{\mu}$ kHz | $4 \cdot 2048\kappa \cdot 2^{-\mu}$ | $2048\kappa \cdot 2^{-\mu}$ | |

Preamble formats for $L_{RA} = 139$ and $\Delta f^{RA} = 15 \cdot 2^{\mu}$ kHz where $\mu \in \{0, 1, 2, 3\}$.

TABLE 3

Mapping from logical index i to sequence number u for preamble formats with $L_{RA} = 839$.

| i | Sequence number u in increasing order of i | | | | | | | | | | |
|---|---|---|---|---|---|---|---|---|---|---|---|
| 0-19 | 129 | 710 | 140 | 699 | 120 | 719 | 210 | 629 | 168 | 671 | 84 |
| 20-39 | 2 | 837 | 1 | 838 | 56 | 783 | 112 | 727 | 148 | 691 | 80 |
| 40-59 | 146 | 693 | 31 | 808 | 28 | 811 | 30 | 809 | 27 | 812 | 29 |
| 60-79 | 178 | 661 | 136 | 703 | 86 | 753 | 78 | 761 | 43 | 796 | 39 |
| 80-99 | 190 | 649 | 181 | 658 | 137 | 702 | 125 | 714 | 151 | 688 | 217 |
| 100-119 | 118 | 721 | 110 | 729 | 89 | 750 | 103 | 736 | 61 | 778 | 55 |
| 120-139 | 34 | 805 | 37 | 802 | 46 | 793 | 207 | 632 | 179 | 660 | 145 |
| 140-159 | 132 | 707 | 133 | 706 | 143 | 696 | 135 | 704 | 161 | 678 | 201 |
| 160-179 | 66 | 773 | 53 | 786 | 10 | 829 | 9 | 830 | 7 | 832 | 8 |
| 180-199 | 104 | 735 | 101 | 738 | 108 | 731 | 208 | 631 | 184 | 655 | 197 |
| 200-219 | 216 | 623 | 218 | 621 | 152 | 687 | 144 | 695 | 134 | 705 | 138 |
| 220-239 | 158 | 681 | 164 | 675 | 174 | 665 | 171 | 668 | 170 | 669 | 87 |
| 240-259 | 82 | 757 | 100 | 739 | 98 | 741 | 71 | 768 | 59 | 780 | 65 |
| 260-279 | 13 | 826 | 6 | 833 | 5 | 834 | 33 | 806 | 51 | 788 | 75 |
| 280-299 | 172 | 667 | 175 | 664 | 187 | 652 | 163 | 676 | 185 | 654 | 200 |
| 300-319 | 195 | 644 | 192 | 647 | 182 | 657 | 157 | 682 | 156 | 683 | 211 |
| 320-339 | 153 | 686 | 213 | 626 | 215 | 624 | 150 | 689 | 225 | 614 | 224 |
| 340-359 | 124 | 715 | 193 | 646 | 205 | 634 | 206 | 633 | 116 | 723 | 160 |
| 360-379 | 77 | 762 | 92 | 747 | 58 | 781 | 62 | 777 | 69 | 770 | 54 |
| 380-399 | 11 | 828 | 4 | 835 | 3 | 836 | 19 | 820 | 22 | 817 | 41 |
| 400-419 | 63 | 776 | 67 | 772 | 72 | 767 | 76 | 763 | 94 | 745 | 102 |
| 420-439 | 209 | 630 | 204 | 635 | 117 | 722 | 188 | 651 | 159 | 680 | 198 |
| 440-459 | 196 | 643 | 155 | 684 | 214 | 625 | 126 | 713 | 131 | 708 | 219 |
| 460-479 | 262 | 577 | 252 | 587 | 418 | 421 | 416 | 423 | 413 | 426 | 411 |
| 480-499 | 379 | 460 | 390 | 449 | 363 | 476 | 384 | 455 | 388 | 451 | 386 |
| 500-519 | 354 | 485 | 328 | 511 | 315 | 524 | 337 | 502 | 349 | 490 | 335 |
| 520-539 | 359 | 480 | 295 | 544 | 385 | 454 | 292 | 547 | 291 | 548 | 381 |
| 540-559 | 377 | 462 | 410 | 429 | 407 | 432 | 281 | 558 | 414 | 425 | 247 |
| 560-579 | 259 | 580 | 237 | 602 | 239 | 600 | 244 | 595 | 243 | 596 | 275 |
| 580-599 | 248 | 591 | 394 | 445 | 393 | 446 | 370 | 469 | 365 | 474 | 300 |
| 600-619 | 312 | 527 | 313 | 526 | 314 | 525 | 353 | 486 | 352 | 487 | 343 |
| 620-639 | 332 | 507 | 333 | 506 | 348 | 491 | 347 | 492 | 322 | 517 | 330 |
| 640-659 | 301 | 538 | 366 | 473 | 401 | 438 | 371 | 468 | 408 | 431 | 375 |
| 660-679 | 257 | 582 | 273 | 566 | 255 | 584 | 254 | 585 | 245 | 594 | 251 |
| 680-699 | 396 | 443 | 392 | 447 | 391 | 448 | 382 | 457 | 389 | 450 | 294 |
| 700-719 | 318 | 521 | 331 | 508 | 325 | 514 | 321 | 518 | 346 | 493 | 339 |
| 720-739 | 378 | 461 | 374 | 465 | 415 | 424 | 270 | 569 | 241 | 598 | 231 |
| 740-759 | 398 | 441 | 290 | 549 | 304 | 535 | 308 | 531 | 358 | 481 | 316 |
| 760-779 | 253 | 586 | 256 | 583 | 263 | 576 | 242 | 597 | 274 | 565 | 402 |
| 780-799 | 307 | 532 | 286 | 553 | 287 | 552 | 266 | 573 | 261 | 578 | 236 |
| 800-819 | 404 | 435 | 406 | 433 | 235 | 604 | 267 | 572 | 302 | 537 | 309 |
| 820-837 | 336 | 503 | 305 | 534 | 373 | 466 | 280 | 559 | 279 | 560 | 419 |

| i | Sequence number u in increasing order of i | | | | | | | | |
|---|---|---|---|---|---|---|---|---|---|
| 0-19 | 755 | 105 | 734 | 93 | 746 | 70 | 769 | 60 | 779 |
| 20-39 | 759 | 42 | 797 | 40 | 799 | 35 | 804 | 73 | 766 |
| 40-59 | 810 | 24 | 815 | 48 | 791 | 68 | 771 | 74 | 765 |
| 60-79 | 800 | 20 | 819 | 21 | 818 | 95 | 744 | 202 | 637 |
| 80-99 | 622 | 128 | 711 | 142 | 697 | 122 | 717 | 203 | 636 |
| 100-119 | 784 | 15 | 824 | 14 | 825 | 12 | 827 | 23 | 816 |
| 120-139 | 694 | 130 | 709 | 223 | 616 | 228 | 611 | 227 | 612 |
| 140-159 | 638 | 173 | 666 | 106 | 733 | 83 | 756 | 91 | 748 |
| 160-179 | 831 | 16 | 823 | 47 | 792 | 64 | 775 | 57 | 782 |
| 180-199 | 642 | 191 | 648 | 121 | 718 | 141 | 698 | 149 | 690 |
| 200-219 | 701 | 199 | 640 | 162 | 677 | 176 | 663 | 119 | 720 |
| 220-239 | 752 | 169 | 670 | 88 | 751 | 107 | 732 | 81 | 758 |

TABLE 3-continued

Mapping from logical index i to sequence number u for preamble formats with $L_{RA} = 839$.

| | | | | | | | | | |
|---|---|---|---|---|---|---|---|---|---|
| 240-259 | 774 | 50 | 789 | 49 | 790 | 26 | 813 | 17 | 822 |
| 260-279 | 764 | 99 | 740 | 96 | 743 | 97 | 742 | 166 | 673 |
| 280-299 | 639 | 114 | 725 | 189 | 650 | 115 | 724 | 194 | 645 |
| 300-319 | 628 | 154 | 685 | 123 | 716 | 139 | 700 | 212 | 627 |
| 320-339 | 615 | 221 | 618 | 220 | 619 | 127 | 712 | 147 | 692 |
| 340-359 | 679 | 186 | 653 | 167 | 672 | 79 | 760 | 85 | 754 |
| 360-379 | 785 | 36 | 803 | 32 | 807 | 25 | 814 | 18 | 821 |
| 380-399 | 798 | 38 | 801 | 44 | 795 | 52 | 787 | 45 | 794 |
| 400-419 | 737 | 90 | 749 | 109 | 730 | 165 | 674 | 111 | 728 |
| 420-439 | 641 | 113 | 726 | 183 | 656 | 180 | 659 | 177 | 662 |
| 440-459 | 620 | 222 | 617 | 226 | 613 | 230 | 609 | 232 | 607 |
| 460-479 | 428 | 376 | 463 | 395 | 444 | 283 | 556 | 285 | 554 |
| 480-499 | 453 | 361 | 478 | 387 | 452 | 360 | 479 | 310 | 529 |
| 500-519 | 504 | 324 | 515 | 323 | 516 | 320 | 519 | 334 | 505 |
| 520-539 | 458 | 399 | 440 | 380 | 459 | 397 | 442 | 369 | 470 |
| 540-559 | 592 | 277 | 562 | 271 | 568 | 272 | 567 | 264 | 575 |
| 560-579 | 564 | 278 | 561 | 250 | 589 | 246 | 593 | 417 | 422 |
| 580-599 | 539 | 299 | 540 | 364 | 475 | 362 | 477 | 298 | 541 |
| 600-619 | 496 | 327 | 512 | 350 | 489 | 326 | 513 | 319 | 520 |
| 620-639 | 509 | 338 | 501 | 341 | 498 | 340 | 499 | 342 | 497 |
| 640-659 | 464 | 249 | 590 | 269 | 570 | 238 | 601 | 234 | 605 |
| 660-679 | 588 | 412 | 427 | 372 | 467 | 282 | 557 | 403 | 436 |
| 680-699 | 545 | 297 | 542 | 311 | 528 | 344 | 495 | 345 | 494 |
| 700-719 | 500 | 351 | 488 | 306 | 533 | 289 | 550 | 400 | 439 |
| 720-739 | 608 | 260 | 579 | 268 | 571 | 276 | 563 | 409 | 430 |
| 740-759 | 523 | 293 | 546 | 288 | 551 | 284 | 555 | 368 | 471 |
| 760-779 | 437 | 383 | 456 | 357 | 482 | 329 | 510 | 317 | 522 |
| 780-799 | 603 | 303 | 536 | 356 | 483 | 355 | 484 | 405 | 434 |
| 800-819 | 530 | 265 | 574 | 233 | 606 | 367 | 472 | 296 | 543 |
| 820-837 | 420 | 240 | 599 | 258 | 581 | 229 | 610 | — | — |

TABLE 4

Mapping from logical index i to sequence number u for preamble formats with $L_{RA} = 139$.

| i | Sequence number u in increasing order of i | | | | | | | | | | | | | | | | | | | |
|---|---|---|---|---|---|---|---|---|---|---|---|---|---|---|---|---|---|---|---|---|
| 0-19 | 1 | 138 | 2 | 137 | 3 | 136 | 4 | 135 | 5 | 134 | 6 | 133 | 7 | 132 | 8 | 131 | 9 | 130 | 10 | 129 |
| 20-39 | 11 | 128 | 12 | 127 | 13 | 126 | 14 | 125 | 15 | 124 | 16 | 123 | 17 | 122 | 18 | 121 | 19 | 120 | 20 | 119 |
| 40-59 | 21 | 118 | 22 | 117 | 23 | 116 | 24 | 115 | 25 | 114 | 26 | 113 | 27 | 112 | 28 | 111 | 29 | 110 | 30 | 109 |
| 60-79 | 31 | 108 | 32 | 107 | 33 | 106 | 34 | 105 | 35 | 104 | 36 | 103 | 37 | 102 | 38 | 101 | 39 | 100 | 40 | 99 |
| 80-99 | 41 | 98 | 42 | 97 | 43 | 96 | 44 | 95 | 45 | 94 | 46 | 93 | 47 | 92 | 48 | 91 | 49 | 90 | 50 | 89 |
| 100-119 | 51 | 88 | 52 | 87 | 53 | 86 | 54 | 85 | 55 | 84 | 56 | 83 | 57 | 82 | 58 | 81 | 59 | 80 | 60 | 79 |
| 120-137 | 61 | 78 | 62 | 77 | 63 | 76 | 64 | 75 | 65 | 74 | 66 | 73 | 67 | 72 | 68 | 71 | 69 | 70 | — | — |
| 138-837 | N/A | | | | | | | | | | | | | | | | | | | |

TABLE 5

$N_{CS}$ for preamble formats with $\Delta f^{RA} = 1.25$ kHz.

| zeroCorrelationZoneConfig | Unrestricted set | Restricted set type A | Restricted set type B |
|---|---|---|---|
| 0 | 0 | 15 | 15 |
| 1 | 13 | 18 | 18 |
| 2 | 15 | 22 | 22 |
| 3 | 18 | 26 | 26 |
| 4 | 22 | 32 | 32 |
| 5 | 26 | 38 | 38 |
| 6 | 32 | 46 | 46 |
| 7 | 38 | 55 | 55 |
| 8 | 46 | 68 | 68 |
| 9 | 59 | 82 | 82 |
| 10 | 76 | 100 | 100 |
| 11 | 93 | 128 | 118 |
| 12 | 119 | 158 | 137 |
| 13 | 167 | 202 | — |

TABLE 5-continued $N_{CS}$ for preamble formats with $\Delta f^{RA} = 1.25$ kHz.

| zeroCorrelationZoneConfig | Unrestricted set | Restricted set type A | Restricted set type B |
|---|---|---|---|
| 14 | 279 | 237 | — |
| 15 | 419 | — | — |

TABLE 6

$N_{CS}$ for preamble formats with $\Delta f^{RA} = 5$ kHz.

| zeroCorrelationZoneConfig | Unrestricted set | Restricted set type A | Restricted set type B |
|---|---|---|---|
| 0 | 0 | 36 | 36 |
| 1 | 13 | 57 | 57 |

TABLE 6-continued $N_{CS}$ for preamble formats with $\Delta f^{RA} = 5$ kHz.

| | $N_{CS}$ value | | |
| zeroCorrelationZoneConfig | Unrestricted set | Restricted set type A | Restricted set type B |
| --- | --- | --- | --- |
| 2 | 26 | 72 | 60 |
| 3 | 33 | 81 | 63 |
| 4 | 38 | 89 | 65 |
| 5 | 41 | 94 | 68 |
| 6 | 49 | 103 | 71 |
| 7 | 55 | 112 | 77 |
| 8 | 64 | 121 | 81 |
| 9 | 76 | 132 | 85 |
| 10 | 93 | 137 | 97 |
| 11 | 119 | 152 | 109 |
| 12 | 139 | 173 | 122 |
| 13 | 209 | 195 | 137 |
| 14 | 279 | 216 | — |
| 15 | 419 | 237 | — |

TABLE 7

$N_{CS}$ for preamble formats with $\Delta f^{RA} = 15 \cdot 2^{\mu}$ kHz where $\mu \in \{0, 1, 2, 3\}$.

| zeroCorrelationZoneConfig | $N_{CS}$ value for unrestricted set |
| --- | --- |
| 0 | 0 |
| 1 | 2 |
| 2 | 4 |
| 3 | 6 |
| 4 | 8 |
| 5 | 10 |
| 6 | 12 |
| 7 | 13 |
| 8 | 15 |
| 9 | 17 |
| 10 | 19 |
| 11 | 23 |
| 12 | 27 |
| 13 | 34 |
| 14 | 46 |
| 15 | 69 |

For more details, reference can be made to TS 38.211.

In this context, a logical root sequence index i (e.g. from 0 to 837) is "valid" when at least one RA preamble can be generated based on this logical root sequence index, or "invalid" when no RA preamble can be generated based on this logical root sequence index. For restricted set type A, in order to check whether a logical root sequence index is valid or not, the following steps can be performed:

1) mapping the root sequence index i to a sequence number u according to Table 3 or Table 4;
2) calculating the variable $d_u$ as described above; and
3) checking whether the condition $N_{CS} \leq d_u < L_{RA}/3$ or $L_{RA}/3 \leq d_u \leq (L_{RA}-N_{CS})/2$ is met, and if either of the two conditions is met, then determining the root sequence index i to be valid, or if neither of the two conditions is met, then determining the root sequence index i to be invalid.

Similarly, for restricted set type B, in order to check whether a logical root sequence index is valid or not, the following steps can be performed:

1) mapping the root sequence index i to a sequence number u according to Table 3 or Table 4;
2) calculating the variable $d_u$ as described above; and
3) check whether the condition $N_{CS} \leq d_u < L_{RA}/5$, $L_{RA}/5 \leq d_u \leq (L_{RA}-N_{CS})/4$, $(L_{RA}+N_{CS})/4 \leq d_u < 2L_{RA}/7 \leq d_u \leq L_{RA}/$ $7 \leq d_u \leq (L_{RA}-N_{CS})/3$, $(L_{RA}+N_{CS})/3 \leq d_u < 2L_{RA}/5$, or $2L_{RA}/5 \leq d_u \leq (L_{RA}-N_{CS})/2$ is met, and if one of the six conditions is met, then determining the root sequence index i to be valid, or if none of the six conditions is met, then determining the root sequence index i to be invalid.

For restricted set type A, valid root sequence indices for each zero correlation zone configuration (or $N_{CS}$ value) can be pre-calculated and stored. It is found that the valid root sequence indices are consecutive for restricted set type A. This means every root sequence index in a range from the smallest valid root sequence index to the largest valid root sequence index is valid. Thus, in order to generate an RA preamble given a particular root sequence index, it can be determined whether the root sequence index falls within the range of the consecutive root sequence index. If so, the root sequence index can be used as a basis for generating an RA preamble, or otherwise a root sequence index in the range (e.g., the smallest root sequence index in the range) can be used as a basis for generating an RA preamble. All root sequence indices out of the range are invalid and may be discarded, without the need to check whether the above two conditions for restricted set type A are met or not.

Similarly, for restricted set type B, valid root sequence indices for each zero correlation zone configuration (or $N_{CS}$ value) can be pre-calculated and stored. However, it is found that the valid root sequence indices are not consecutive for restricted set type B. This means one or more root sequence indices in a range from the smallest valid root sequence index to the largest valid root sequence index are invalid. Thus, in order to generate an RA preamble given a particular root sequence index, it can be determined whether the root sequence index falls within the range. If so, the root sequence index can be used as a basis for attempting to generate an RA preamble (as not all indices within the range are valid), or otherwise a root sequence index in the range (e.g., the smallest root sequence index in the range) can be used as a basis for attempting to generate an RA preamble. All root sequence indices out of the range are invalid and may be discarded, without the need to check whether the above six conditions for restricted set type B are met or not.

FIG. 1 is a flowchart illustrating a method 100 according to an embodiment of the present disclosure. The method 100 can be performed at a communication device, e.g., a terminal device or a network device.

At block 110, the communication device determines whether a configured root sequence index falls within a predetermined range of root sequence indices. Here, the predetermined range is for a restricted set configuration (e.g., restricted set type A or restricted set type B) and a zero correlation zone configuration (or $N_{CS}$ value).

In an example, a smallest root sequence index in the predetermined range may be a minimum value, among available root sequence indices, that is valid for generating a random access preamble, depending on the restricted set configuration and the zero correlation zone configuration. A largest root sequence index in the predetermined range may be a maximum value, among available root sequence indices, that is valid for generating a random access preamble, depending on the restricted set configuration and the zero correlation zone configuration.

In an example, information identifying the predetermined range for the restricted set configuration and the zero correlation zone configuration (or $N_{CS}$ value) can be stored in the communication device. For example, such information may include the smallest root sequence index and the largest root sequence index of the predetermined range. In an exemplary implementation, the information identifying the predetermined range for each restricted set configuration (restricted set type A or restricted set type B) and each zero correlation zone configuration (or $N_{CS}$ value) can be stored in the communication device.

For example, for restricted set type A, PRACH preamble format 0/1/2, and PRACH sub-carrier spacing of 1.25 KHz, the predetermined ranges corresponding to respective zero correlation zone configurations (or $N_{CS}$ values) are shown in Table 8 below, each represented by a minimum valid root sequence index and a maximum valid root sequence index.

TABLE 8

| Root sequence index range for restricted set type A and preamble format 0/1/2 with $\Delta f^{RA}$ = 1.25 kHz | | | |
|---|---|---|---|
| zeroCorrelationZoneConfig | $N_{CS}$ value for restricted set type A | Minimum valid root sequence index | Maximum valid root sequence index |
| 0 | 36 | 24 | 819 |
| 1 | 57 | 30 | 815 |
| 2 | 72 | 36 | 809 |
| 3 | 81 | 42 | 803 |
| 4 | 89 | 52 | 795 |
| 5 | 94 | 64 | 789 |
| 6 | 103 | 76 | 777 |
| 7 | 112 | 90 | 765 |
| 8 | 121 | 116 | 751 |
| 9 | 132 | 136 | 729 |
| 10 | 137 | 168 | 707 |
| 11 | 152 | 204 | 659 |
| 12 | 173 | 264 | 629 |
| 13 | 195 | 328 | 561 |
| 14 | 216 | 384 | 513 |

For example, for restricted set type B, PRACH preamble format 0/1/2, and PRACH sub-carrier spacing of 1.25 KHz, the predetermined ranges corresponding to respective zero correlation zone configurations (or $N_{CS}$ values) are shown in Table 9 below, each represented by a minimum valid root sequence index and a maximum valid root sequence index.

TABLE 9

| Root sequence index range for restricted set type B and preamble format 0/1/2 with $\Delta f^{RA}$ = 1.25 kHz | | | |
|---|---|---|---|
| zeroCorrelationZoneConfig | $N_{CS}$ value for restricted set type B | Minimum valid root sequence index | Maximum valid root sequence index |
| 0 | 15 | 24 | 819 |
| 1 | 18 | 30 | 815 |
| 2 | 22 | 36 | 809 |
| 3 | 26 | 42 | 803 |
| 4 | 32 | 52 | 795 |
| 5 | 38 | 64 | 789 |
| 6 | 46 | 76 | 777 |
| 7 | 55 | 90 | 765 |
| 8 | 68 | 116 | 751 |
| 9 | 82 | 136 | 729 |
| 10 | 100 | 168 | 707 |
| 11 | 118 | 168 | 701 |
| 12 | 137 | 204 | 659 |

At block 120, the communication device sets a current root sequence index to the configured root sequence index when the configured root sequence index falls within the predetermined range, or to the smallest root sequence index in the predetermined range when the configured root sequence index does not fall within the predetermined range.

At block 130, the communication device generates, or attempts to generate, at least one random access preamble based on the current root sequence index. e.g., according to the equations for RA preamble generation as described above.

In an example, when the attempt in the block 130 fails, or when a total number of random access preambles to be generated has not been reached after the at least one random access preamble is generated in the block 130, the communication device may increment the current root sequence index in a cyclic (or wrap-around) manner within the predetermined range, and generate, or attempt to generate, at least one random access preamble based on the incremented current root sequence index. Here, the term "cyclic" or "wrap-around" means that, when the current root sequence index equals to the largest root sequence index in the predetermined range, by incrementing the current root sequence index (e.g. by one), the resulting root sequence index will be the smallest root sequence index in the predetermined range.

In an example, the method 100 may be performed at a physical layer. The configured root sequence index, the restricted set configuration, the zero correlation zone configuration, and/or the total number of random access preambles to be generated may be higher-layer configured parameters, e.g., may be prach-RootSequenceIndex, restrictedSetConfig, zeroCorrelationZoneConfig, and totalNumberOfRA-Preambles, respectively.

In an example, the communication device may be a terminal device (e.g., a UE), and one or more of the higher-layer configured parameters may be received from a network device.

In another example, the communication device may be a network device (e.g., a gNB).

Two examples will be given below for further explaining the above method.

Example 1

It is assumed in this example that the higher-layer configured parameters are:

restrictedSetConfig: restricted set type A,
totalNumberOfRA-Preambles: 16,
zeroCorrelationZoneConfig: 12, and
prach-RootSequenceIndex: 10.

Referring to Table 8, when zeroCorrelationZoneConfig=12, the predetermined range is from 264 to 629. The configured root sequence index (10) does not fall within the range, and the current root sequence index is set to the smallest root sequence index in the range, i.e., 264. Assuming that one RA preamble can be generated based on each root sequence index, in total 16 RA preambles can be generated based on root sequence indices 264-279, respectively. Here, each time an RA preamble is generated, the current root sequence index is incremented by one for generating the next RA preamble.

Example 2

It is assumed in this example that the higher-layer configured parameters are:

restrictedSetConfig: restricted set type A,
totalNumberOfRA-Preambles: 16,
zeroCorrelationZoneConfig: 12, and
prach-RootSequenceIndex: 622.

Referring to Table 8, when zeroCorrelationZoneConfig=12, the predetermined range is from 264 to 629. The configured root sequence index (622) falls within the range, and the current root sequence index is set to the configured root sequence index, i.e., 622. Assuming that one RA preamble can be generated based on each root sequence index, in total 16 RA preambles can be generated based on root sequence indices 622-629 and 264-271, respectively. Here, each time an RA preamble is generated, the current root sequence index is incremented by one for generating the next RA preamble. It is to be noted here that, after generating an RA preamble based on the root sequence index 629 (the largest root sequence index in the range), the current root sequence index is incremented by one in a cyclic (or wrap-around) manner within the range, i.e., to the smallest root sequence index in the range, i.e., 264.

Correspondingly to the method 100 as described above, a communication device is provided. FIG. 2 is a block diagram of a communication device 200 according to an embodiment of the present disclosure.

The communication device 200 is operative to perform the method 100 as described above in connection with FIG. 1. The communication device 200 includes a determining unit 210 configured to determine whether a configured root sequence index falls within a predetermined range of root sequence indices. The predetermined range is for a restricted set configuration and a zero correlation zone configuration. The communication device 200 further includes a setting unit 220 configured to set a current root sequence index to the configured root sequence index when the configured root sequence index falls within the predetermined range, or to a smallest root sequence index in the predetermined range when the configured root sequence index does not fall within the predetermined range. The communication device 200 further includes a generating unit 230 configured to generate, or attempt to generate, at least one random access preamble based on the current root sequence index.

In an embodiment, the smallest root sequence index may be a minimum value, among available root sequence indices, that is valid for generating a random access preamble, depending on the restricted set configuration and the zero correlation zone configuration.

In an embodiment, a largest root sequence index in the predetermined range may be a maximum value, among available root sequence indices, that is valid for generating a random access preamble, depending on the restricted set configuration and the zero correlation zone configuration.

In an embodiment, the restricted set configuration may include restricted set type A or restricted set type B.

In an embodiment, the communication device 200 may further include a storing unit configured to store information identifying the predetermined range for the restricted set configuration and the zero correlation zone configuration.

In an embodiment, the information may include the smallest root sequence index and the largest root sequence index of the predetermined range.

In an embodiment, the generating unit 230 may further configured to, when the attempting fails or when a total number of random access preambles to be generated has not been reached after the at least one random access preamble is generated: increment the current root sequence index in a cyclic manner within the predetermined range; and generate, or attempt to generate, at least one random access preamble based on the incremented current root sequence index.

In an embodiment, the operations of the determining unit 210, the setting unit 220, and the generating unit 230 may be performed at a physical layer, and the configured root sequence index, the restricted set configuration, the zero correlation zone configuration, and/or the total number of random access preambles to be generated may be higher-layer configured parameters.

In an embodiment, the communication device 200 may be a terminal device, and one or more of the higher-layer configured parameters may be received from a network device.

In an embodiment, the communication device 200 may be a network device.

The units 210-230 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 3:
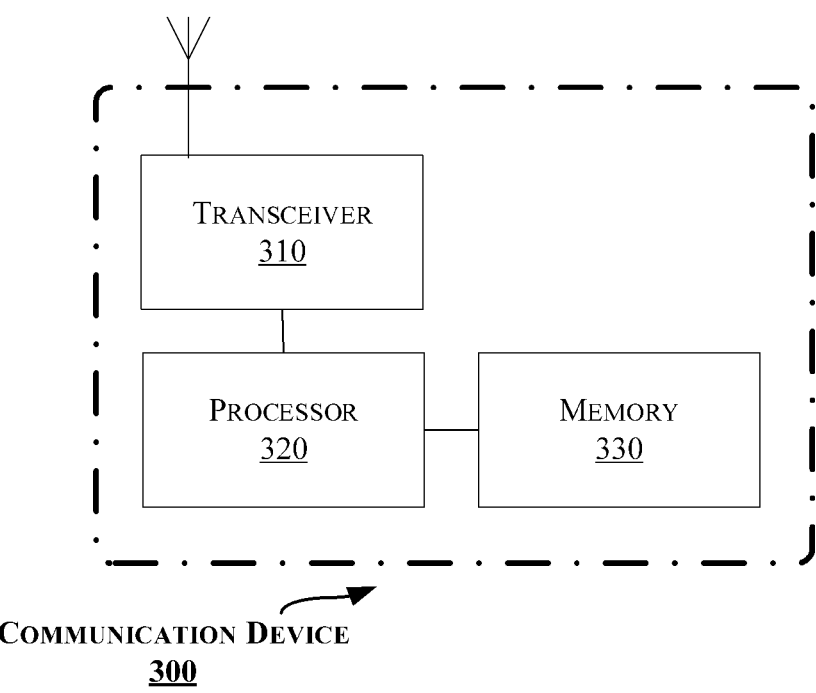
FIG. 3 is a block diagram of a communication device according to another embodiment of the present disclosure.

FIG. 3 is a block diagram of a communication device 300 according to another embodiment of the present disclosure.

The communication device 300 includes a transceiver 310, a processor 320 and a memory 330.

The memory 330 may contain instructions executable by the processor 320 whereby the communication device 300 is operative to perform the actions. e.g., of the procedure described earlier in conjunction with FIG. 1. Particularly, the memory 330 may contain instructions executable by the processor 320 whereby the communication device 300 is operative to: determine whether a configured root sequence index falls within a predetermined range of root sequence indices, the predetermined range being for a restricted set configuration and a zero correlation zone configuration; set a current root sequence index to the configured root sequence index when the configured root sequence index falls within the predetermined range, or to a smallest root sequence index in the predetermined range when the configured root sequence index does not fall within the predetermined range; and generate, or attempt to generate, at least one random access preamble based on the current root sequence index.

In an embodiment, the smallest root sequence index may be a minimum value, among available root sequence indices, that is valid for generating a random access preamble, depending on the restricted set configuration and the zero correlation zone configuration.

In an embodiment, a largest root sequence index in the predetermined range may be a maximum value, among available root sequence indices, that is valid for generating a random access preamble, depending on the restricted set configuration and the zero correlation zone configuration.

In an embodiment, the restricted set configuration may include restricted set type A or restricted set type B.

In an embodiment, the memory 330 may further contain instructions executable by the processor 320 whereby the communication device 300 is operative to: store information identifying the predetermined range for the restricted set configuration and the zero correlation zone configuration.

In an embodiment, the information may include the smallest root sequence index and the largest root sequence index of the predetermined range.

In an embodiment, the memory 330 may further contain instructions executable by the processor 320 whereby the communication device 300 is operative to, when the attempting fails or when a total number of random access preambles to be generated has not been reached after the at least one random access preamble is generated: increment the current root sequence index in a cyclic manner within the predetermined range; and generate, or attempt to generate, at least one random access preamble based on the incremented current root sequence index.

In an embodiment, the operations of determining, setting, and generating may be performed at a physical layer, and the configured root sequence index, the restricted set configuration, the zero correlation zone configuration, and/or the total number of random access preambles to be generated may be higher-layer configured parameters.

In an embodiment, the communication device 300 may be a terminal device, and one or more of the higher-layer configured parameters may be received from a network device.

In an embodiment, the communication device 300 may be a network device.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 320 causes the communication device 300 to perform the actions. e.g., of the procedure described earlier in conjunction with FIG. 1.

The computer program product may be configured as a computer program code structured in computer program modules. The computer program modules could essentially perform the actions of the flow illustrated in FIG. 1.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried in a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

Figure 4:
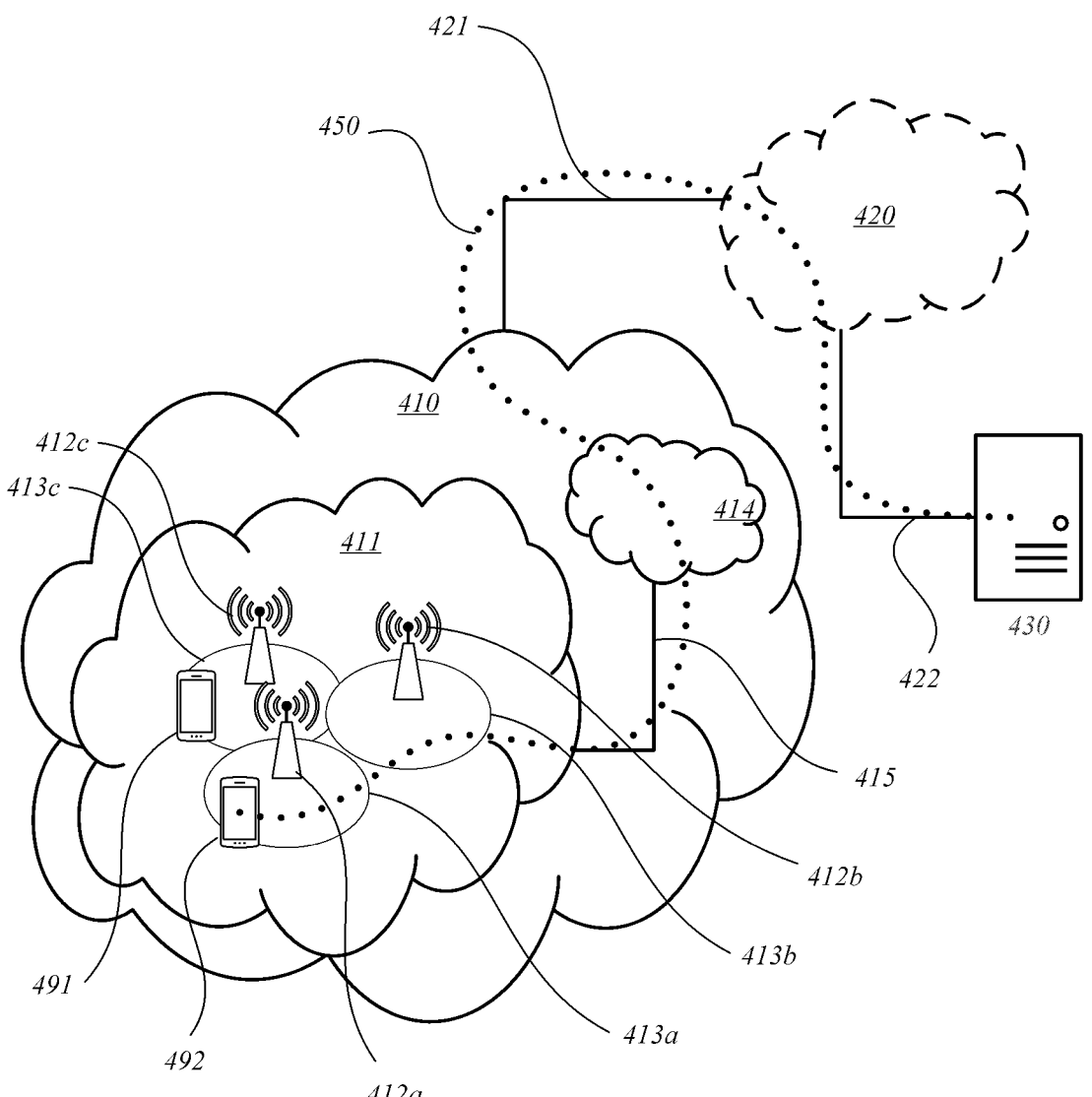
FIG. 4 schematically illustrates a telecommunication network connected via an intermediate network to a host computer.

With reference to FIG. 4, in accordance with an embodiment, a communication system includes a telecommunication network 410, such as a 3GPP-type cellular network, which comprises an access network 411, such as a radio access network, and a core network 414. The access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to the core network 414 over a wired or wireless connection 415. A first user equipment (UE) 491 located in coverage area 413c is configured to wirelessly connect to, or be paged by, the corresponding base station 412c. A second UF 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

The telecommunication network 410 is itself connected to a host computer 430, which may be embodied in the hardware and/or software of a standalone server, a cloud-implemented server, a distributed server or as processing resources in a server farm. The host computer 430 may be under the ownership or control of a service provider, or may be operated by the service provider or on behalf of the service provider. The connections 421, 422 between the telecommunication network 410 and the host computer 430 may extend directly from the core network 414 to the host computer 430 or may go via an optional intermediate network 420. The intermediate network 420 may be one of, or a combination of more than one of, a public, private or hosted network; the intermediate network 420, if any, may be a backbone network or the Internet; in particular, the intermediate network 420 may comprise two or more sub-networks (not shown).

The communication system of FIG. 4 as a whole enables connectivity between one of the connected UEs 491, 492 and the host computer 430. The connectivity may be described as an over-the-top (OTT) connection 450. The host computer 430 and the connected UEs 491, 492 are configured to communicate data and/or signaling via the OTT connection 450, using the access network 411, the core network 414, any intermediate network 420 and possible further infrastructure (not shown) as intermediaries. The OTT connection 450 may be transparent in the sense that the participating communication devices through which the OTT connection 450 passes are unaware of routing of uplink and downlink communications. For example, a base station 412 may not or need not be informed about the past routing of an incoming downlink communication with data originating from a host computer 430 to be forwarded (e.g., handed over) to a connected UE 491. Similarly, the base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 5. In a communication system 500, a host computer 510 comprises hardware 515 including a communication interface 516 configured to set up and maintain a wired or wireless connection with an interface of a different communication device of the communication system 500. The host computer 510 further comprises processing circuitry 518, which may have storage and/or processing capabilities. In particular, the processing circuitry 518 may comprise one or more programmable processors, application-specific integrated circuits, field programmable gate arrays or combinations of these (not shown) adapted to execute instructions. The host computer 510 further comprises software 511, which is stored in or accessible by the host computer 510 and executable by the processing circuitry 518. The software 511 includes a host application 512. The host application 512 may be operable to provide a service to a remote user, such as a UE 530 connecting via an OTT connection 550 terminating at the UE 530 and the host computer 510. In providing the service to the remote user, the host application 512 may provide user data which is transmitted using the OTT connection 550.

The communication system 500 further includes a base station 520 provided in a telecommunication system and comprising hardware 525 enabling it to communicate with the host computer 510 and with the UE 530. The hardware 525 may include a communication interface 526 for setting up and maintaining a wired or wireless connection with an interface of a different communication device of the communication system 500, as well as a radio interface 527 for setting up and maintaining at least a wireless connection 570 with a UE 530 located in a coverage area (not shown in FIG. 5) served by the base station 520. The communication interface 526 may be configured to facilitate a connection 560 to the host computer 510. The connection 560 may be direct or it may pass through a core network (not shown in FIG. 5) of the telecommunication system and/or through one or more intermediate networks outside the telecommunication system. In the embodiment shown, the hardware 525 of the base station 520 further includes processing circuitry 528, which may comprise one or more programmable processors, application-specific integrated circuits, field programmable gate arrays or combinations of these (not shown) adapted to execute instructions. The base station 520 further has software 521 stored internally or accessible via an external connection.

The communication system 500 further includes the UE 530 already referred to. Its hardware 535 may include a radio interface 537 configured to set up and maintain a wireless connection 570 with a base station serving a coverage area in which the UE 530 is currently located. The hardware 535 of the UE 530 further includes processing circuitry 538, which may comprise one or more programmable processors, application-specific integrated circuits, field programmable gate arrays or combinations of these (not shown) adapted to execute instructions. The UE 530 further comprises software 531, which is stored in or accessible by the UE 530 and executable by the processing circuitry 538. The software 531 includes a client application 532. The client application 532 may be operable to provide a service to a human or non-human user via the UE 530, with the support of the host computer 510. In the host computer 510, an executing host application 512 may communicate with the executing client application 532 via the OTT connection 550 terminating at the UE 530 and the host computer 510. In providing the service to the user, the client application 532 may receive request data from the host application 512 and provide user data in response to the request data. The OTT connection 550 may transfer both the request data and the user data. The client application 532 may interact with the user to generate the user data that it provides.

Figure 5:
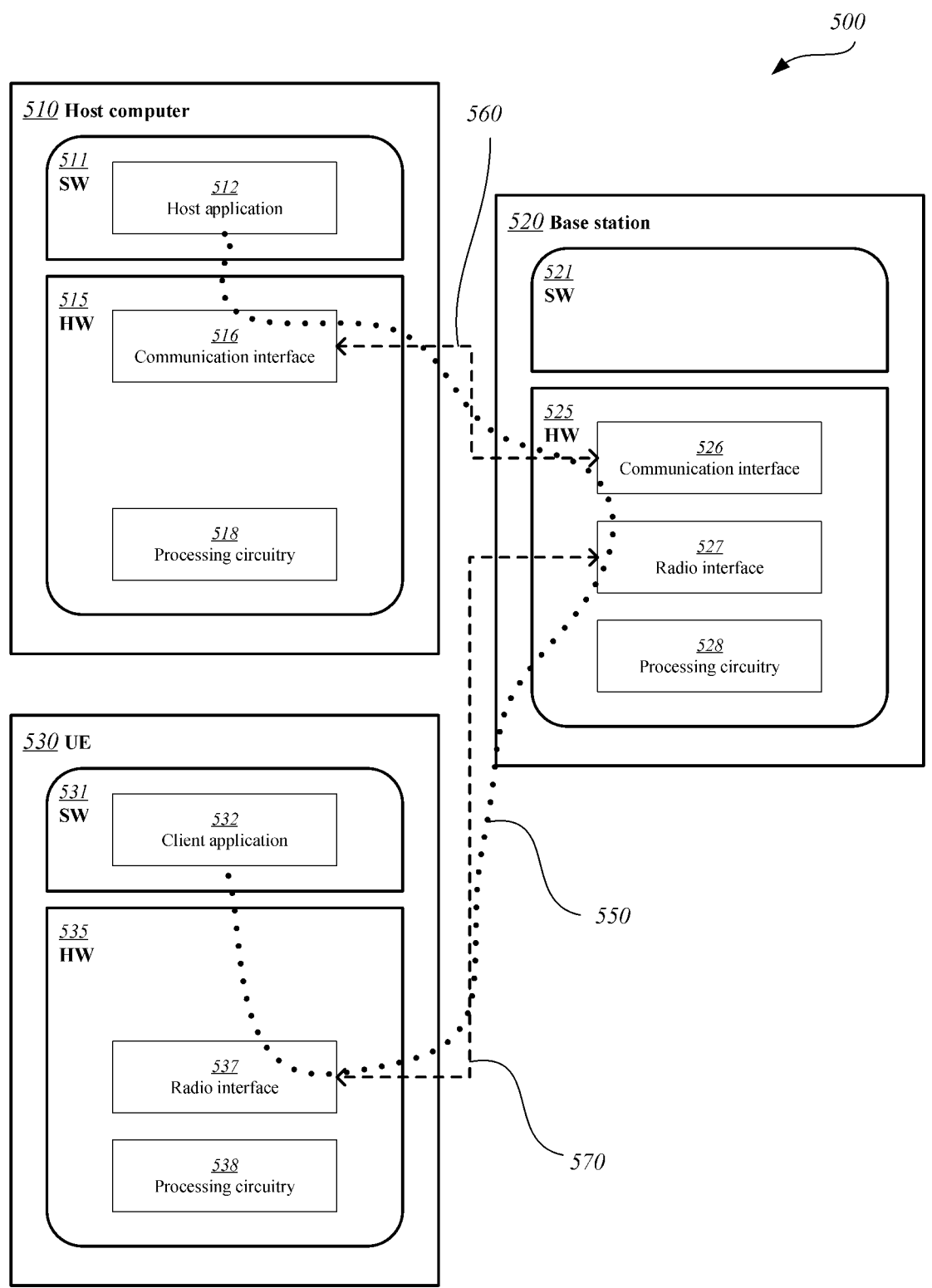
FIG. 5 is a generalized block diagram of a host computer communicating via a base station with a user equipment over a partially wireless connection.

It is noted that the host computer 510, base station 520 and UE 530 illustrated in FIG. 5 may be identical to the host computer 430, one of the base stations 412a, 412b, 412c and one of the UEs 491, 492 of FIG. 4, respectively. This is to say, the inner workings of these entities may be as shown in FIG. 5 and independently, the surrounding network topology may be that of FIG. 4.

In FIG. 5, the OTT connection 550 has been drawn abstractly to illustrate the communication between the host computer 510 and the use equipment 530 via the base station 520, without explicit reference to any intermediary devices and the precise routing of messages via these devices. Network infrastructure may determine the routing, which it may be configured to hide from the UE 530 or from the service provider operating the host computer 510, or both. While the OTT connection 550 is active, the network infrastructure may further take decisions by which it dynamically changes the routing (e.g., on the basis of load balancing consideration or reconfiguration of the network).

The wireless connection 570 between the UE 530 and the base station 520 is in accordance with the teachings of the embodiments described throughout this disclosure. One or more of the various embodiments improve the performance of OTT services provided to the UE 530 using the OTT connection 550, in which the wireless connection 570 forms the last segment. More precisely, the teachings of these embodiments may improve the latency and thereby provide benefits such as reduced user waiting time at the UE.

A measurement procedure may be provided for the purpose of monitoring data rate, latency and other factors on which the one or more embodiments improve. There may further be an optional network functionality for reconfiguring the OTT connection 550 between the host computer 510 and UE 530, in response to variations in the measurement results. The measurement procedure and/or the network functionality for reconfiguring the OTT connection 550 may be implemented in the software 511 of the host computer 510 or in the software 531 of the UE 530, or both. In embodiments, sensors (not shown) may be deployed in or in association with communication devices through which the OTT connection 550 passes; the sensors may participate in the measurement procedure by supplying values of the monitored quantities exemplified above, or supplying values of other physical quantities from which software 511, 531 may compute or estimate the monitored quantities. The reconfiguring of the OTT connection 550 may include message format, retransmission settings, preferred routing etc.; the reconfiguring need not affect the base station 520, and it may be unknown or imperceptible to the base station 520. Such procedures and functionalities may be known and practiced in the art. In certain embodiments, measurements may involve proprietary UE signaling facilitating the host computer's 510 measurements of throughput, propagation times, latency and the like. The measurements may be implemented in that the software 511, 531 causes messages to be transmitted, in particular empty or 'dummy' messages, using the OTT connection 550 while it monitors propagation times, errors etc.

FIG. 6 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 6 will be included in this section. In a first step 610 of the method, the host computer provides user data. In an optional substep 611 of the first step 610, the host computer provides the user data by executing a host application. In a second step 620, the host computer initiates a transmission carrying the user data to the UE. In an optional third step 630, the base station transmits to the UE the user data which was carried in the transmission that the host computer initiated, in accordance with the teachings of the embodiments described throughout this disclosure. In an optional fourth step 640, the UE executes a client application associated with the host application executed by the host computer.

FIG. 7 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 7 will be included in this section. In a first step 710 of the method, the host computer provides user data. In an optional substep (not shown) the host computer provides the user data by executing a host application. In a second step 720, the host computer initiates a transmission carrying the user data to the UE. The transmission may pass via the base station, in accordance with the teachings of the embodiments described throughout this disclosure. In an optional third step 730, the UE receives the user data carried in the transmission.

FIG. 8 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 8 will be included in this section. In an optional first step 810 of the method, the UE receives input data provided by the host computer. Additionally or alternatively, in an optional second step 820, the UE provides user data. In an optional substep 821 of the second step 820, the UE provides the user data by executing a client application. In a further optional substep 811 of the first step 810, the UE executes a client application which provides the user data in reaction to the received input data provided by the host computer. In providing the user data, the executed client application may further consider user input received from the user. Regardless of the specific manner in which the user data was provided, the UE initiates, in an optional third substep 830, transmission of the user data to the host computer. In a fourth step 840 of the method, the host computer receives the user data transmitted from the UE, in accordance with the teachings of the embodiments described throughout this disclosure.

FIG. 9 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 9 will be included in this section. In an optional first step 910 of the method, in accordance with the teachings of the embodiments described throughout this disclosure, the base station receives user data from the UE. In an optional second step 920, the base station initiates transmission of the received user data to the host computer. In a third step 930, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a communication device, comprising:

determining whether a configured root sequence index falls within a predetermined range of root sequence indices, wherein the predetermined range is for a restricted set configuration and a zero correlation zone configuration;

setting a current root sequence index to the configured root sequence index when the configured root sequence index falls within the predetermined range, or to a smallest root sequence index in the predetermined range when the configured root sequence index does not fall within the predetermined range; and generating, or attempting to generate, at least one random access preamble based on the current root sequence index.

2. The method of claim 1, wherein the smallest root sequence index is a minimum value, among available root sequence indices, that is valid for generating a random access preamble, depending on the restricted set configuration and the zero correlation zone configuration.

3. The method of claim 1, wherein a largest root sequence index in the predetermined range is a maximum value, among available root sequence indices, that is valid for generating a random access preamble, depending on the restricted set configuration and the zero correlation zone configuration.

4. The method of claim 1, wherein the restricted set configuration comprises restricted set type A or restricted set type B.

5. The method of claim 1, further comprising:

storing information identifying the predetermined range for the restricted set configuration and the zero correlation zone configuration.

6. The method of claim 5, wherein the information comprises the smallest root sequence index and the largest root sequence index of the predetermined range.

7. The method of claim 1, further comprising, when the attempting fails or when a total number of random access preambles to be generated has not been reached after the at least one random access preamble is generated:

incrementing the current root sequence index in a cyclic manner within the predetermined range; and generating, or attempting to generate, at least one random access preamble based on the incremented current root sequence index.

8. The method of claim 7, wherein the method is performed at a physical layer, and wherein the configured root sequence index, the restricted set configuration, the zero correlation zone configuration, and/or the total number of random access preambles to be generated are higher-layer configured parameters.

9. The method of claim 8, wherein the communication device is a terminal device, and wherein one or more of the higher-layer configured parameters are received from a network device.

10. The method of claim 8, wherein the communication device is a network device.

11. A communication device, comprising a transceiver, a processor, and a memory, the memory comprising instructions executable by the processor whereby the communication device is operative to perform the method of claim 1.

12. A non-transitory computer readable storage medium having computer program instructions stored thereon, the computer program instructions, when executed by a processor in a communication device, causing the communication device to perform the method of claim 1.

* * * * *